US010052643B2

(12) United States Patent
Moretti

(10) Patent No.: US 10,052,643 B2
(45) Date of Patent: Aug. 21, 2018

(54) DEVICE FOR CONTAINING A FLUID SUBSTANCE

(71) Applicant: LUMSON S.P.A., Capergnanica (IT)

(72) Inventor: Matteo Moretti, Crema (CR) (IT)

(73) Assignee: LUMSON S.P.A., Capergnanica (CR) (IT)

( * ) Notice: Subject to any disclaimer, the term of this patent is extended or adjusted under 35 U.S.C. 154(b) by 0 days.

(21) Appl. No.: 15/381,076

(22) Filed: Dec. 15, 2016

(65) Prior Publication Data

US 2017/0173614 A1 Jun. 22, 2017

(30) Foreign Application Priority Data

Dec. 17, 2015 (EP) .................................... 15425109

(51) Int. Cl.

*B65D 35/22* (2006.01)
*B65D 37/00* (2006.01)
*B67D 7/60* (2010.01)
*G01F 11/00* (2006.01)
*B05B 11/00* (2006.01)
*B65D 1/02* (2006.01)
*B65D 25/14* (2006.01)

(52) U.S. Cl.

CPC ...... *B05B 11/0045* (2013.01); *B05B 11/0097* (2013.01); *B05B 11/3047* (2013.01); *B65D 1/023* (2013.01); *B65D 25/14* (2013.01)

(58) Field of Classification Search

CPC ...... B05B 11/0045; B65D 83/62; A61K 8/046
USPC ......... 222/94, 256, 380, 386.5, 387, 402.16, 222/632, 635
See application file for complete search history.

(56) References Cited

U.S. PATENT DOCUMENTS 4,266,941 A * 5/1981 Sullivan .................... B01L 3/50 222/94
4,969,577 A * 11/1990 Werding ................ B65D 83/14 141/3

(Continued)

FOREIGN PATENT DOCUMENTS

EP 2366529 A1 9/2011
FR 2695111 A1 3/1994
FR 2730708 A1 8/1996

OTHER PUBLICATIONS

EP Search Report of Jun. 3, 2016 for EP Patent Application No. 15425109 to Lumson S.p.A. filed Dec. 17, 2015.

*Primary Examiner* — Vishal Pancholi
(74) *Attorney, Agent, or Firm* — Vorys, Sater, Seymour and Pease LLP

(57) ABSTRACT

Device for containing fluid substance, including a bag having at least one flexible side wall, a substantially rigid neck delimiting an opening giving access to an internal cavity of the bag, shaped to at least partially accommodate a pumping member for pumping the fluid substance, and provided with a connector for connection to an external container. The bag is made from multilayer material, and the neck is made from a material different from bag material and includes a cup-shaped element having a bottom wall with at least one opening, and a side wall on the outer surface of which the upper edge of the bag is hermetically connected. The device includes a valve element for moving from an opening position, wherein the valve element makes the bag internal cavity accessible, and a closing position, wherein the valve element inhibits access to the internal cavity.

10 Claims, 16 Drawing Sheets

(56) References Cited

U.S. PATENT DOCUMENTS

| | | | | |
|---|---|---|---|---|
| 7,455,195 | B2 * | 11/2008 | Mekata | B05B 11/0043 222/105 |
| 8,328,047 | B2 * | 12/2012 | Walters | B65D 83/62 222/105 |
| 8,752,731 | B2 * | 6/2014 | Nimmo | B65B 31/003 141/2 |
| 2007/0262092 | A1 * | 11/2007 | Tyski | B65D 47/122 222/209 |
| 2010/0264166 | A1 * | 10/2010 | Moretti | B05B 11/0043 222/105 |
| 2010/0276448 | A1 * | 11/2010 | Moretti | B05B 11/0043 222/105 |
| 2011/0062185 | A1 | 3/2011 | McFarland | |
| 2011/0227258 | A1 * | 9/2011 | Patrini | B29C 49/18 264/526 |
| 2011/0309113 | A1 * | 12/2011 | Hui | B05B 11/0056 222/402.16 |
| 2012/0288465 | A1 * | 11/2012 | Loechel | A61K 8/046 424/70.28 |

* cited by examiner

DEVICE FOR CONTAINING A FLUID SUBSTANCE

The present invention refers to a device for containing a fluid substance according to the pre-characterizing part of the main claim.

At present devices are known for containing a fluid substance which comprise a flexible bag provided with a rigid neck. Usually the flexible bag and its own rigid neck are made from one and the same thermoplastic material, for instance via injection-stretching-blowing and extrusion-blowing processes.

Such devices are illustrated for instance in patents EP2197589, EP2243557 or in patent application EP2366529.

The devices can be improved, in particular concerning the efficiency of the barrier offered by the bag itself. From this point of view, the polycoupled (PE-AL-PE, PE-AL-PA, OE-AL-EVOH, PE-PET-PE, PE-PET-PA) film materials are particularly advantageous materials in that they offer an optimum protection to the substance contained in the bag.

Therefore, bags have been developed which comprise a body made from a multilayer material comprising one or several barrier layers, and a rigid neck made from a rigid plastic material and firmly associated with the bag. For example, the bag features an upper edge welded around the neck. With such type of bag, the substance is inserted inside the bag before mounting the pumping member in the neck.

A problem encountered with this type of bags is that of being able to fill the bag in a vacuum atmosphere and of keeping the substance, contained inside the bag, as much isolated as possible from the external world, so as to protect the substance as much as possible.

These objects and others are achieved by realizing a device for containing a fluid substance realized according to the technical teachings of the attached claims.

Further features and advantages of the invention will be apparent from the description of a preferred but not exclusive embodiment of the device for containing a fluid substance, illustrated for explanatory hence not limitative purposes in the attached drawings, wherein.

Figure 1:
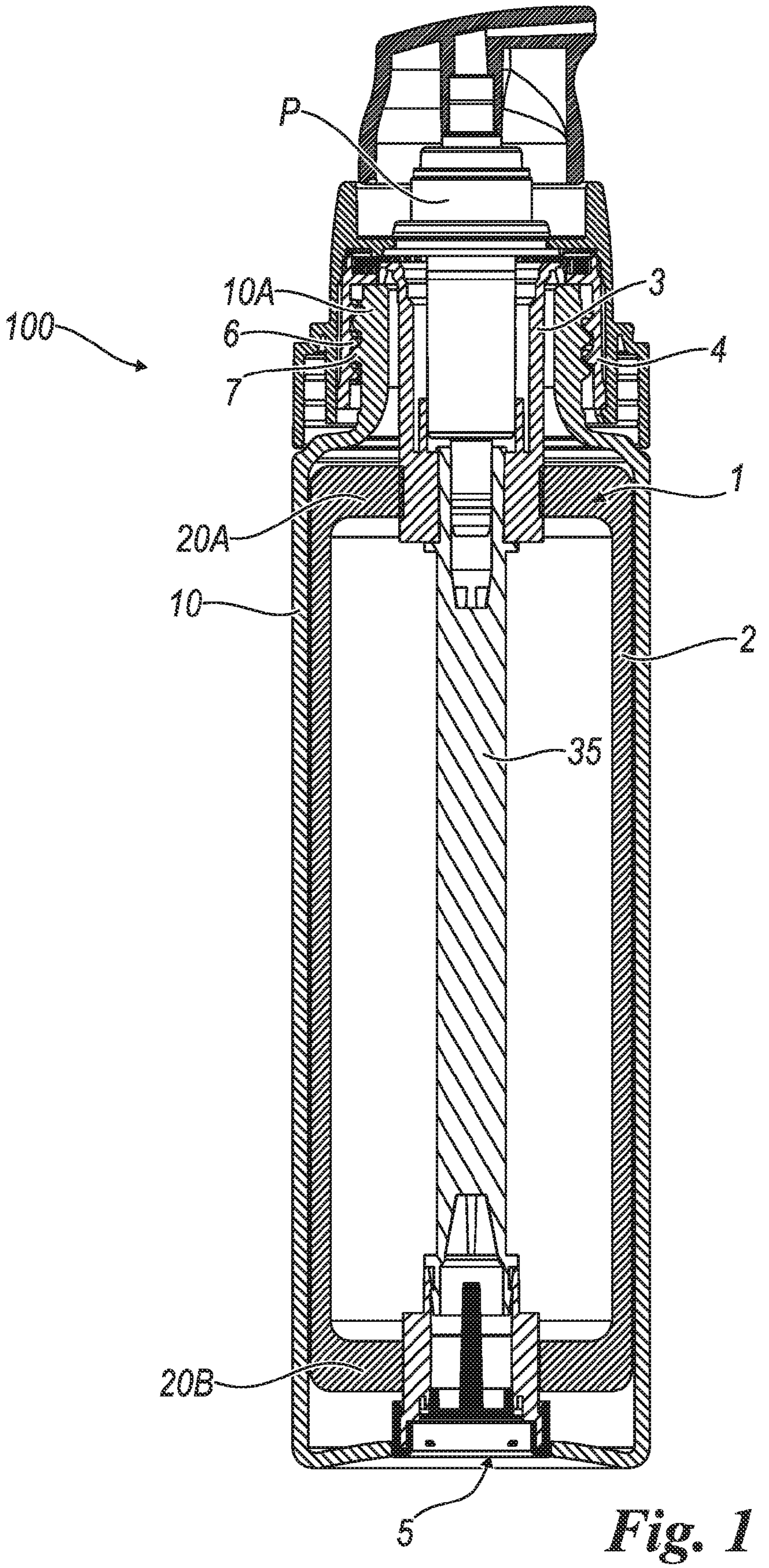
FIG. 1 is a cross-sectional view of a dispensing system comprising a first embodiment of the device according to the invention.
Figure 4A:
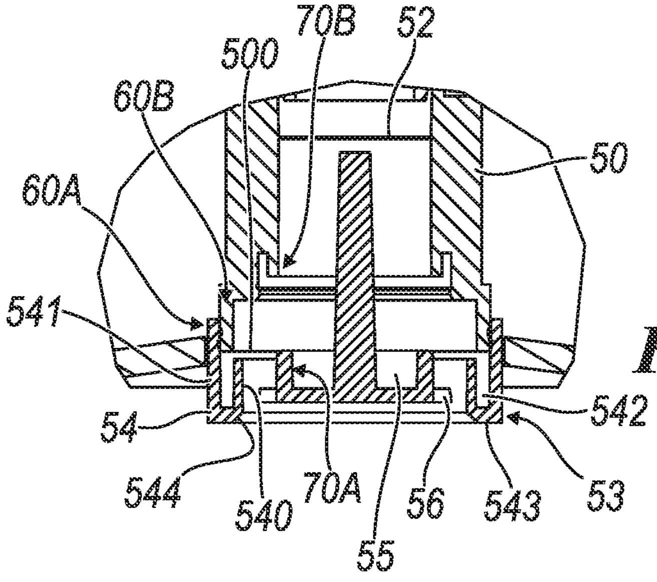
Figure 4B:
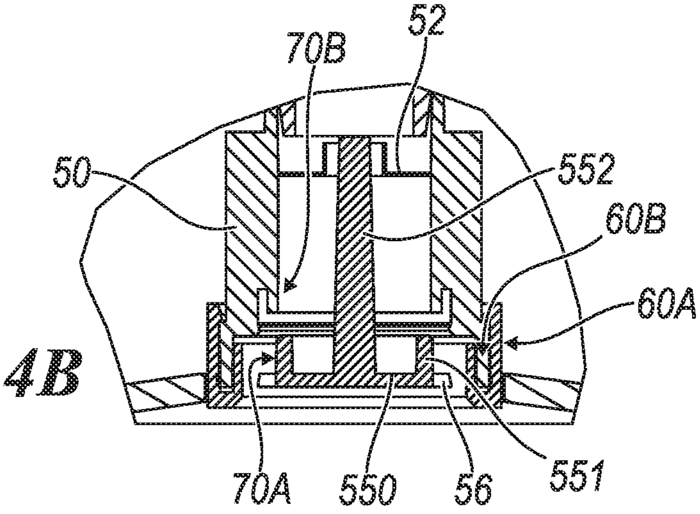
Figure 4C:
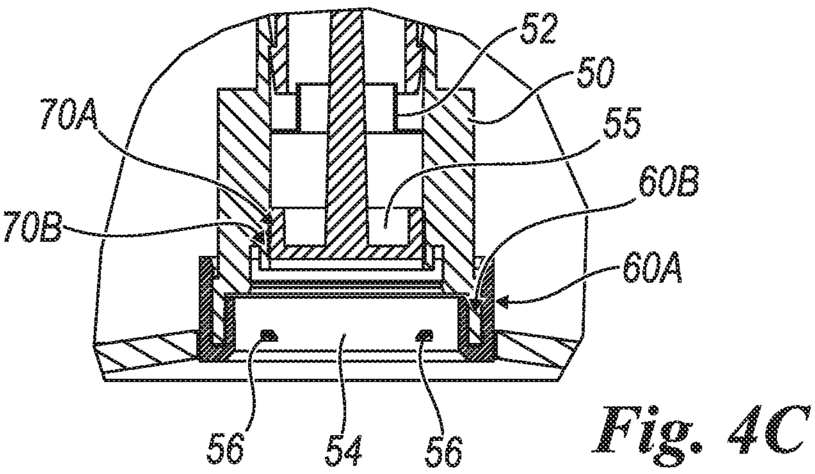
Figure 5:
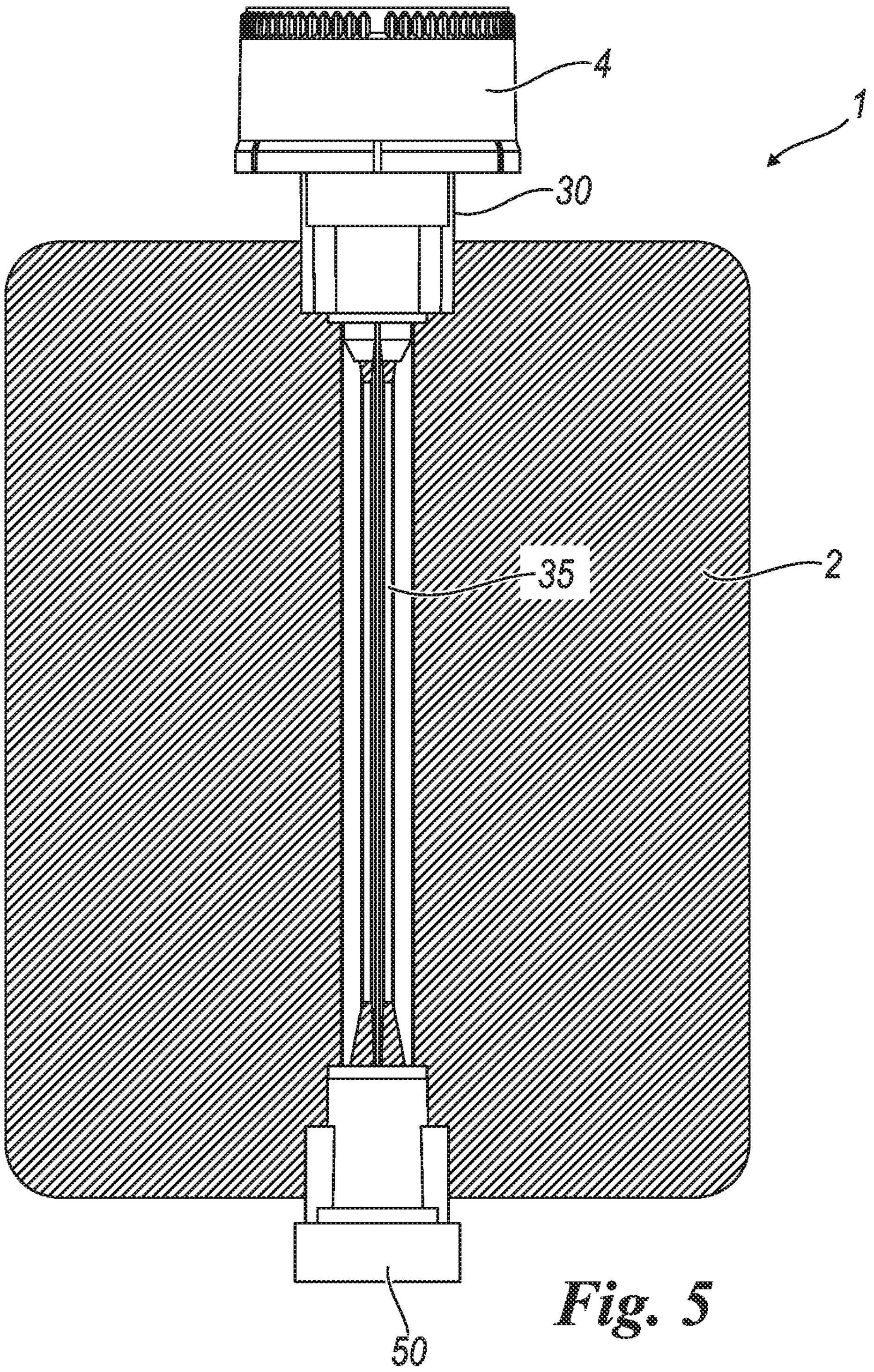
Figure 6:
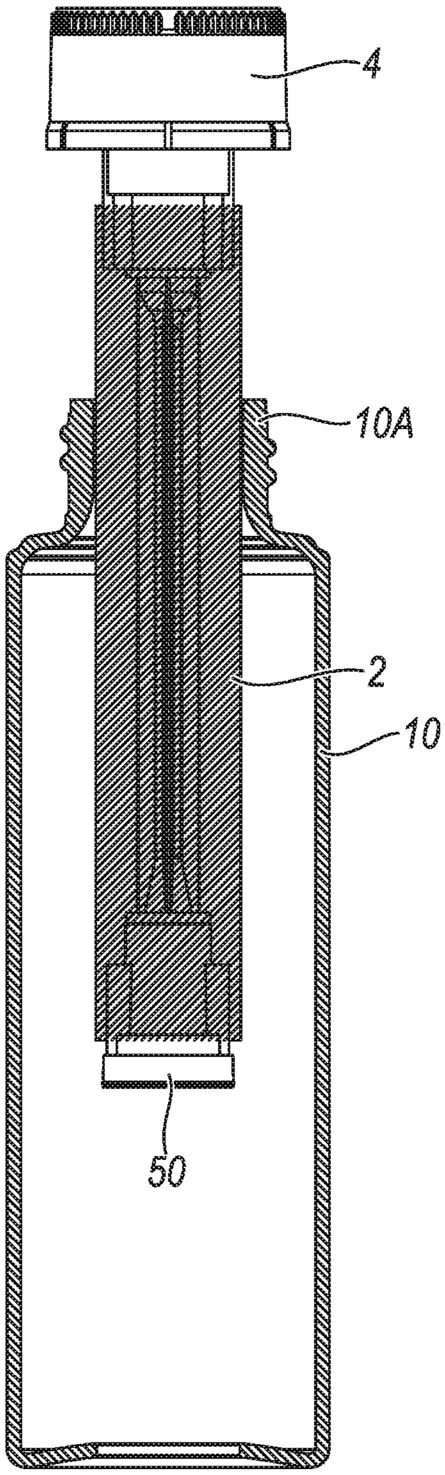
Figure 7:
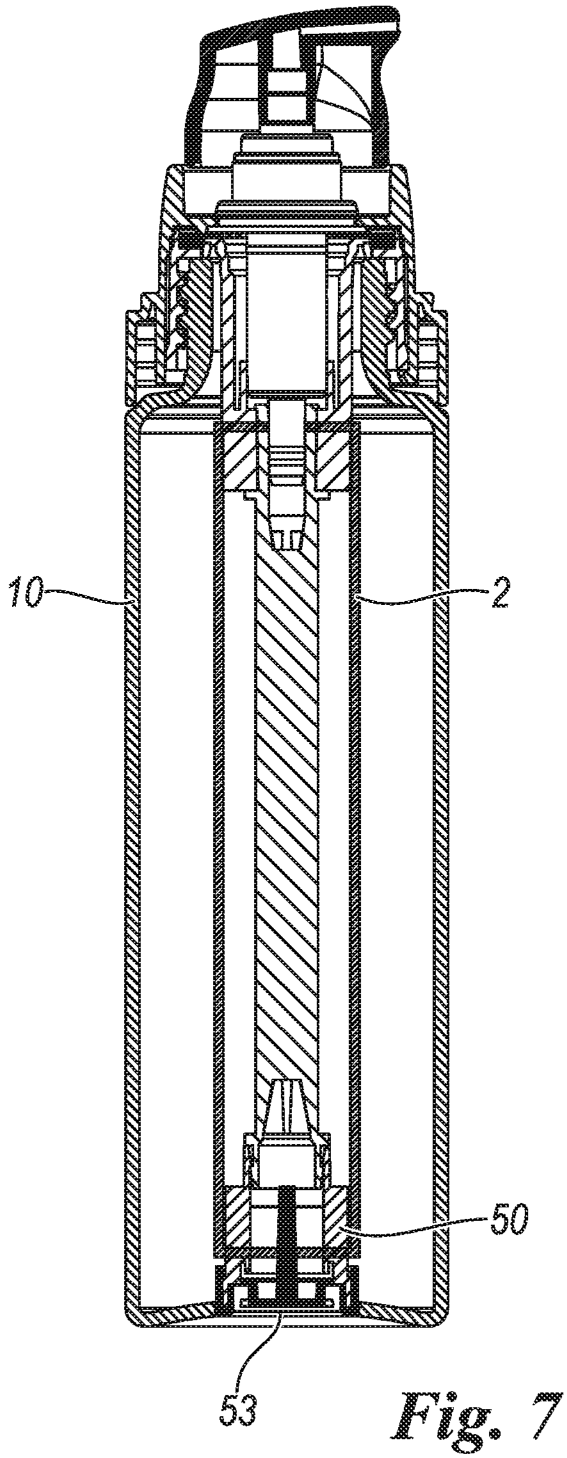
Figure 8:
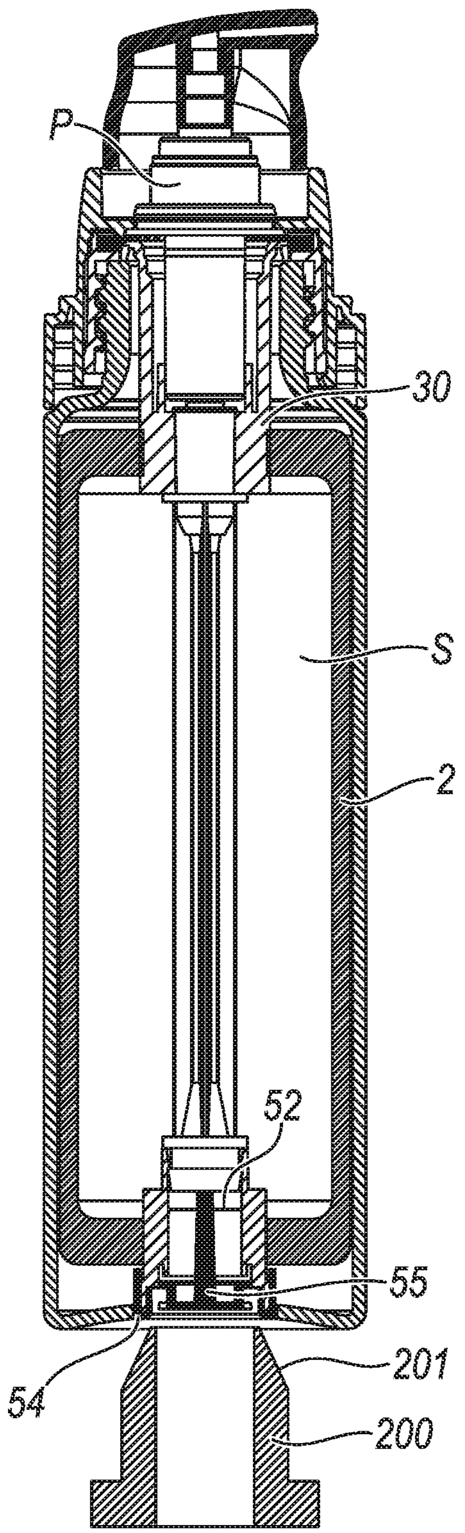
Figure 9:
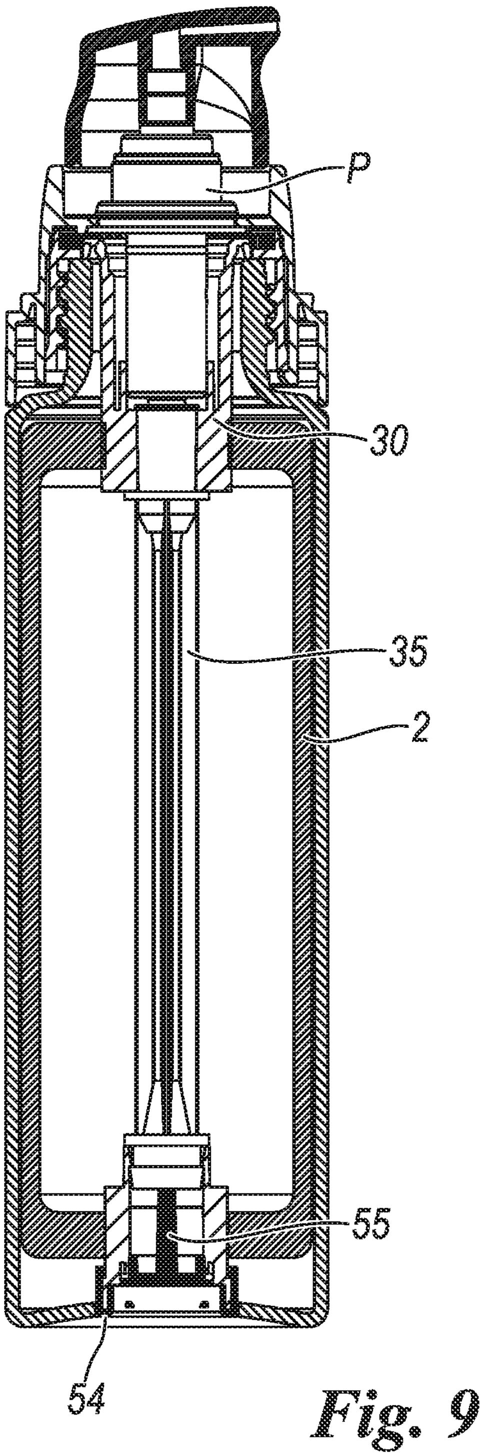
Figure 10:
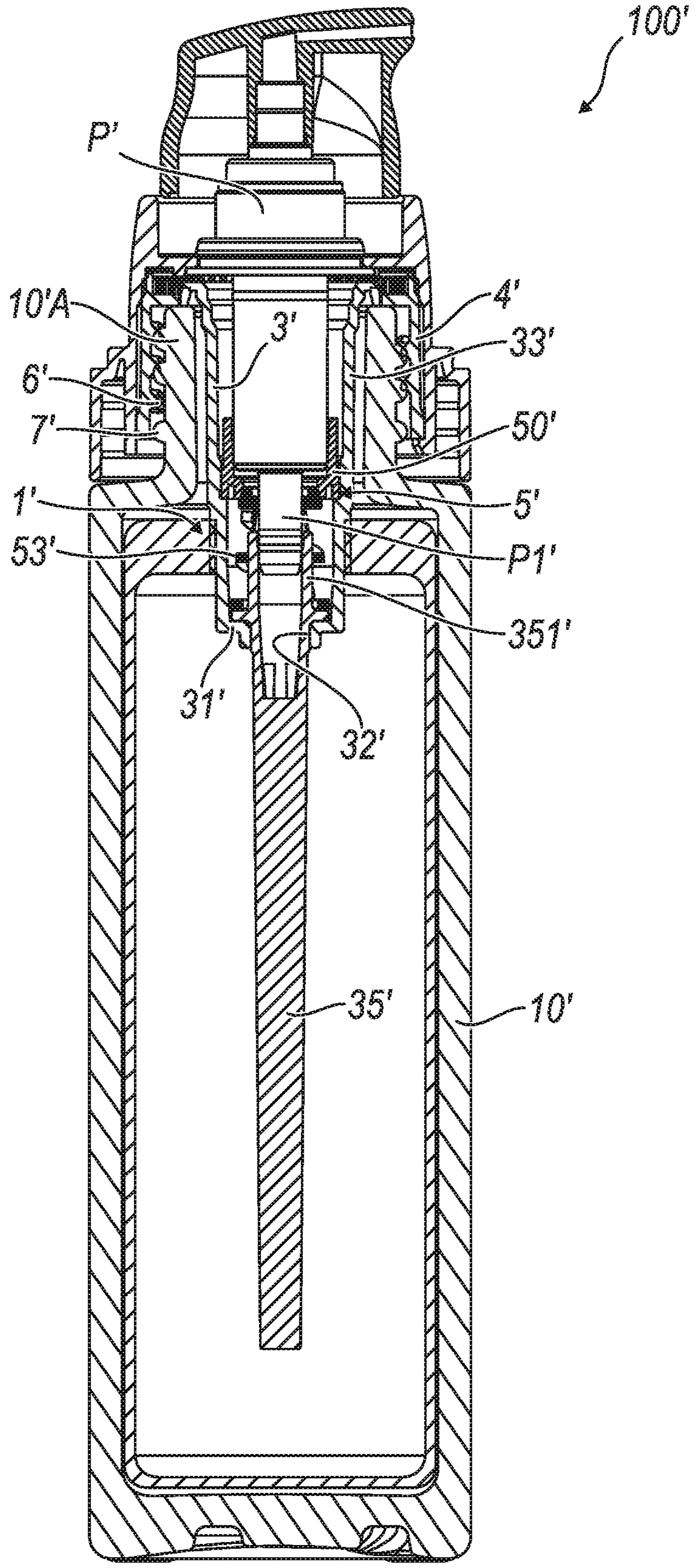
Figure 11:
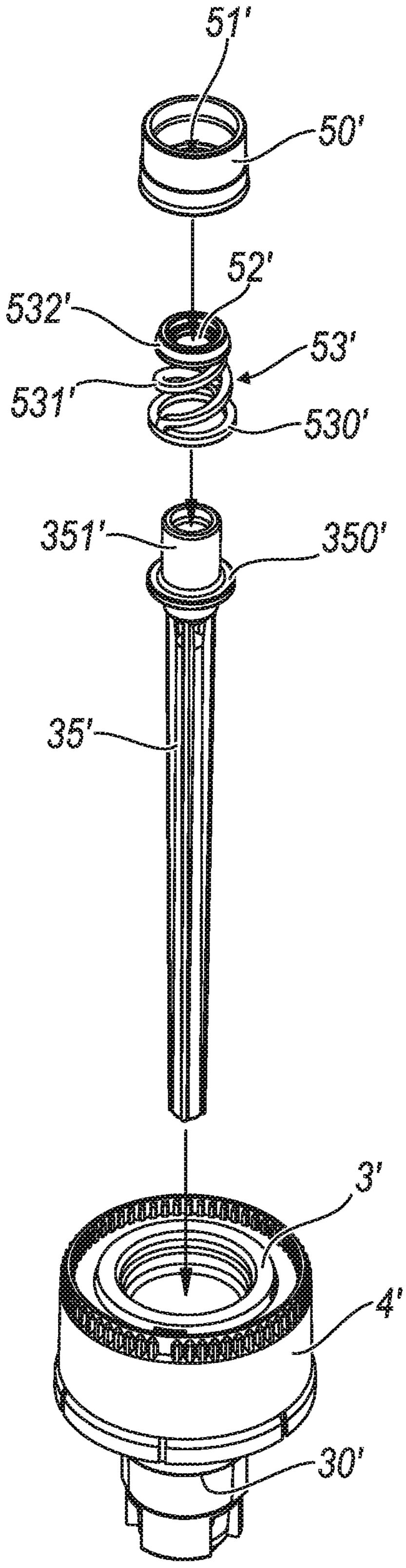
Figure 12A:
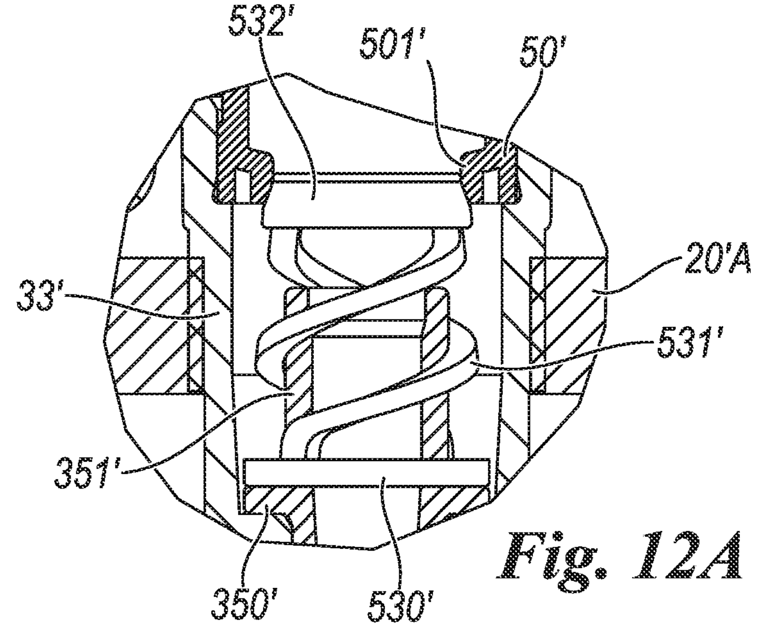
Figure 12B:
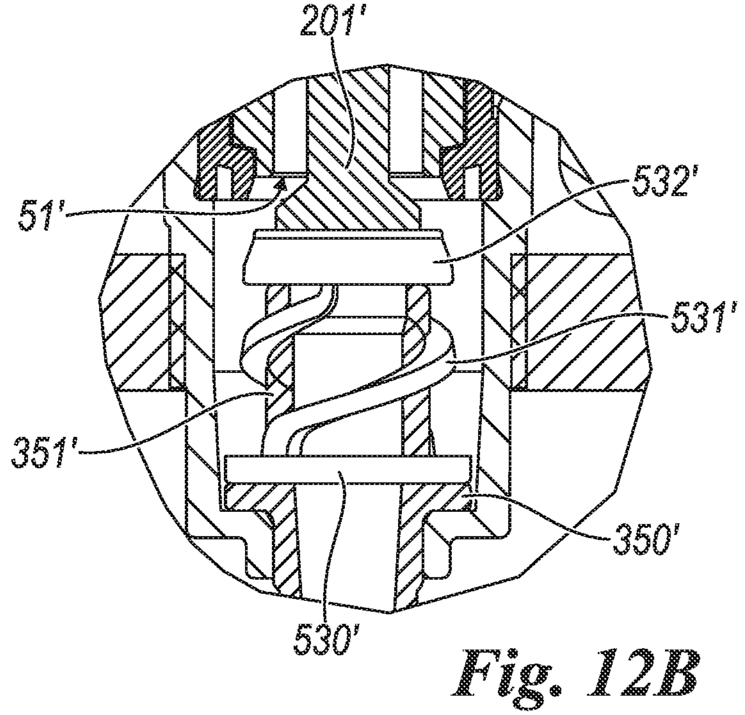
Figure 12C:
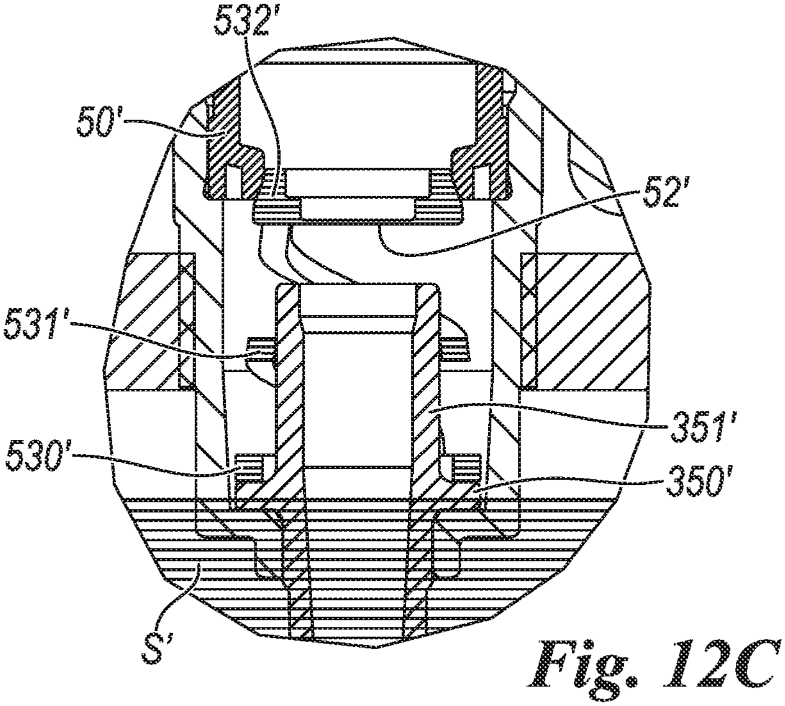
Figure 12D:
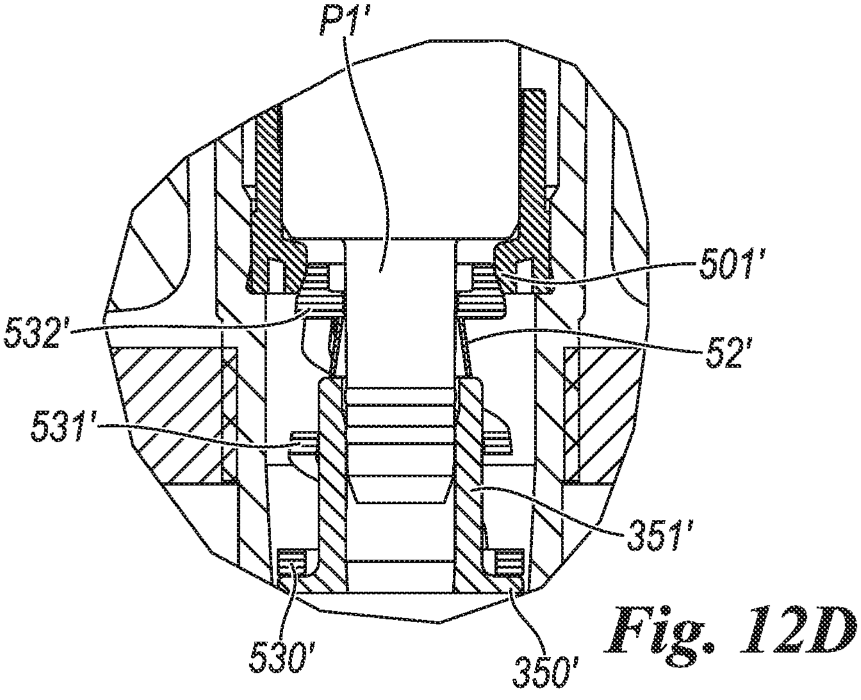
Figure 13:
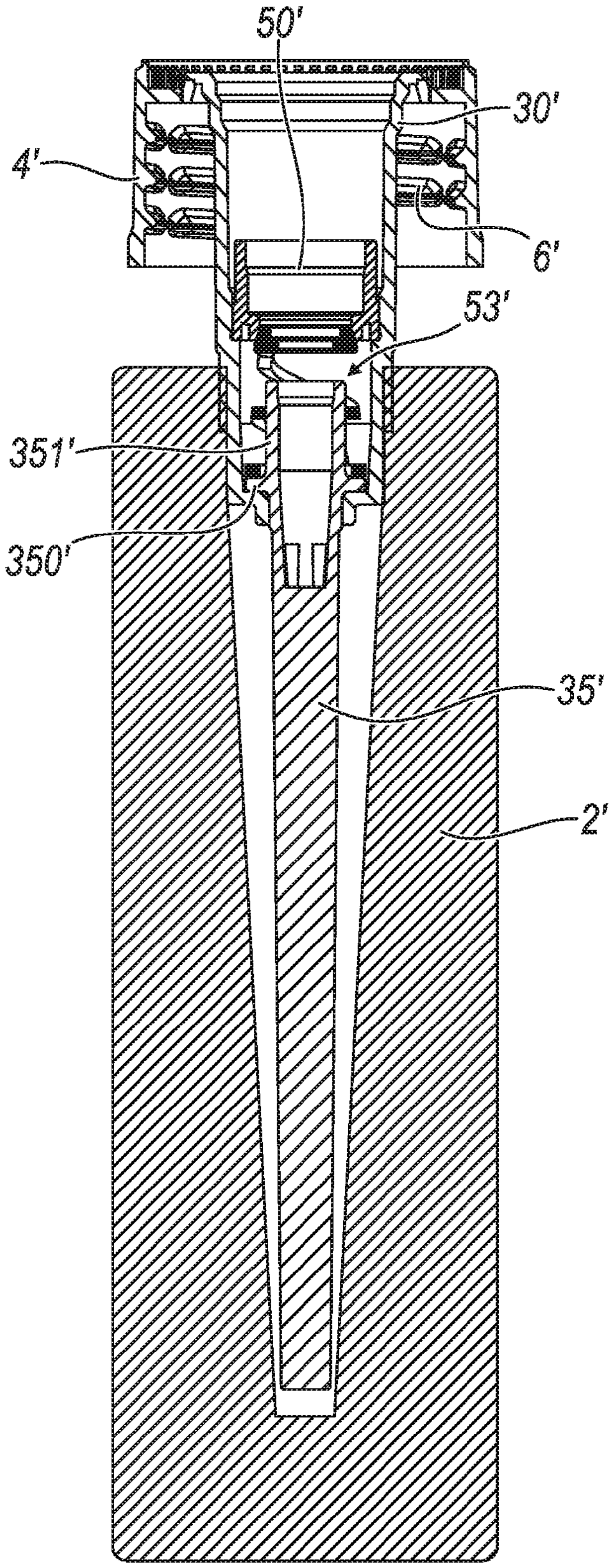
Figure 14:
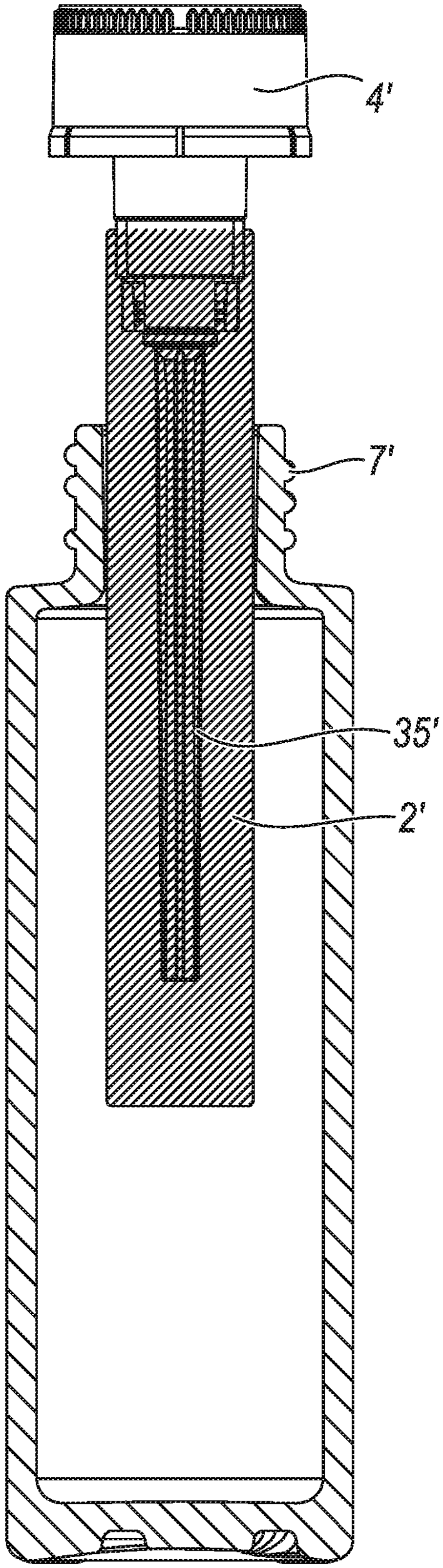
Figure 15:
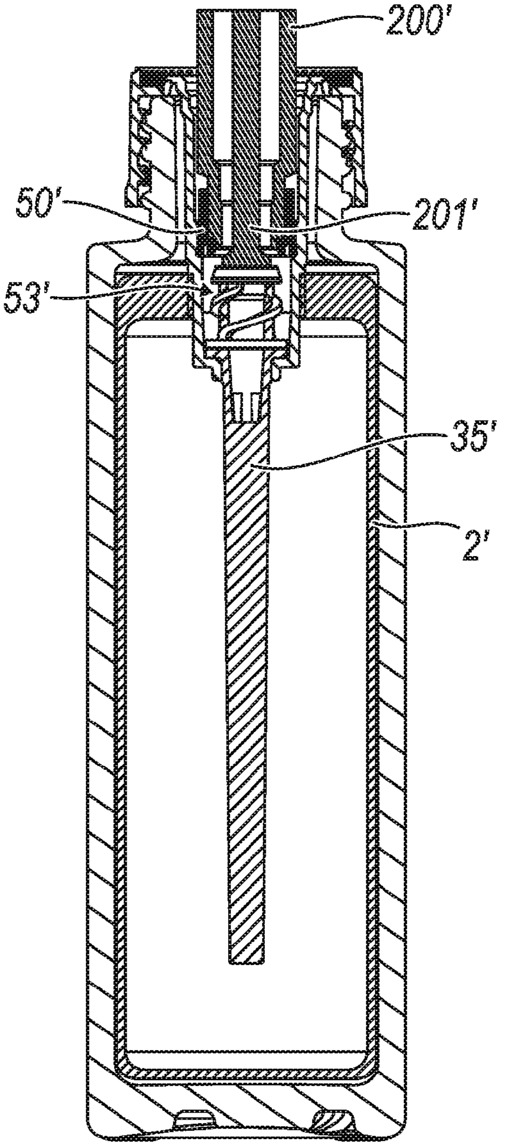
Figure 16:
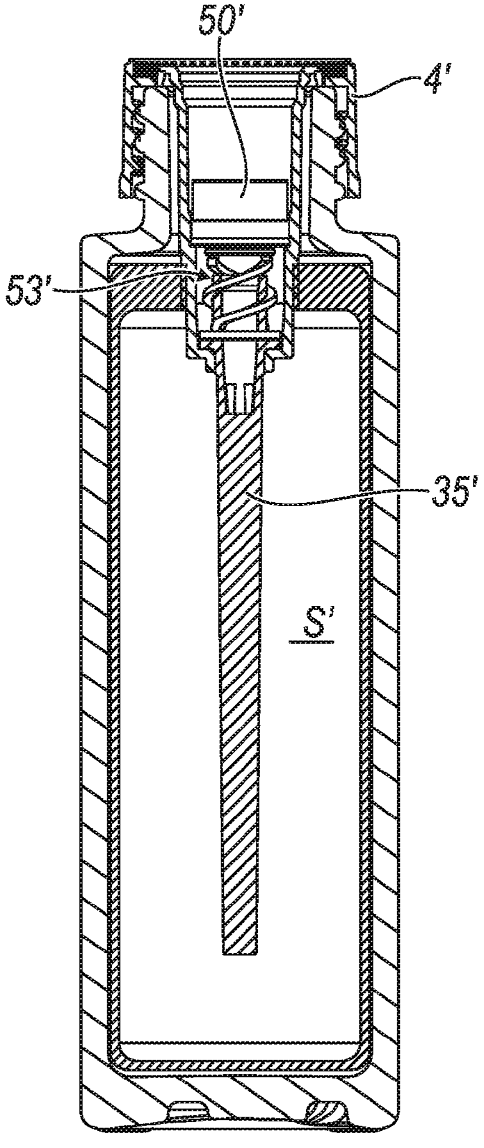

FIGS. 4A, 4B, and 4C are enlarged views of a detail of the device of FIG. 1, in three subsequent operating positions;

FIGS. 5 thru 7 are front and cross-sectional views of subsequent assembling steps of the dispensing system containing the device of FIG. 1;

FIGS. 8 and 9 are front and cross-sectional views of subsequent filling and closing steps of the dispensing system;

FIG. 10 is a cross-sectional view of a dispensing system comprising a second embodiment of the device according to the invention;

FIG. 11 is a perspective and exploded view of the device of FIG. 10;

FIGS. 12A, 12B, 12C, and 12D are enlarged views of a detail of the device of FIG. 10, in four subsequent operating positions;

FIGS. 13 and 14 are front and cross-sectional views of subsequent assembling steps of a dispensing system containing the device of FIG. 10;

FIGS. 15 and 16 are front and cross-sectional views of the filling and closing steps of the dispensing system.

With reference to the mentioned figures, they show a device 1 for containing a fluid substance S, the fluid substance having to be dispensed via a manually-operated pumping member P, for instance a pump. In particular the device 1 is suitable for being connected to the neck 10A of a rigid external container 10.

The device for containing a fluid substance comprises:

- a bag 2 comprising at least one flexible side wall 2A, 2B, and
- a substantially rigid neck 3 extending from the bag 2 and delimiting an opening giving access to an inner cavity of the bag 2, the neck 3 being shaped in such a way as to at least partially accommodate the pumping member P used to pump the fluid substance S, and being provided with connection means 4 for its connection to the external container 10 (FIG. 1).

In the illustrated example, such connection members 4 comprise a crown-shaped element provided with an inner threading suitable for engaging a counter-threading on the external surface of the neck 10A of the external container 10, as already known to those skilled in this art.

The bag 2 is made from a multilayer material preferably containing at least one aluminium layer, for instance polycoupled (PE-AL-PE/PE-AL-PA/PE-AL-EVOH/PE-PET-PE/PE-PET-PA) film materials.

By multilayer material we mean, in the context of the present invention, a material composed of various layers of different materials, which create an indivisible film.

The pumping member P is suitable for creating in the bag a vacuum (with respect to the ambient pressure) ranging from approximately 250 to 600 millibars, and more preferably equal to approximately 400 millibars. In this range of pressures the bag is completely deformed.

Therefore, in the present context, by flexible or deformable bag we mean a bag that is completely deformed at the vacuum values created by the pump as indicated above, whereas by rigid neck we mean a neck that does not undergo any deformations.

Preferably the side wall 2A of the bag 2 comprises at least one flat element 20 provided with at least one upper edge 20A and one lower edge 20B, wherein at least the upper edge 20A and the lower edge 20B are hermetically closed, the neck 3 of the bag 2 departing from the upper edge 20A of the side wall 2A of the bag 2.

Figure 2:
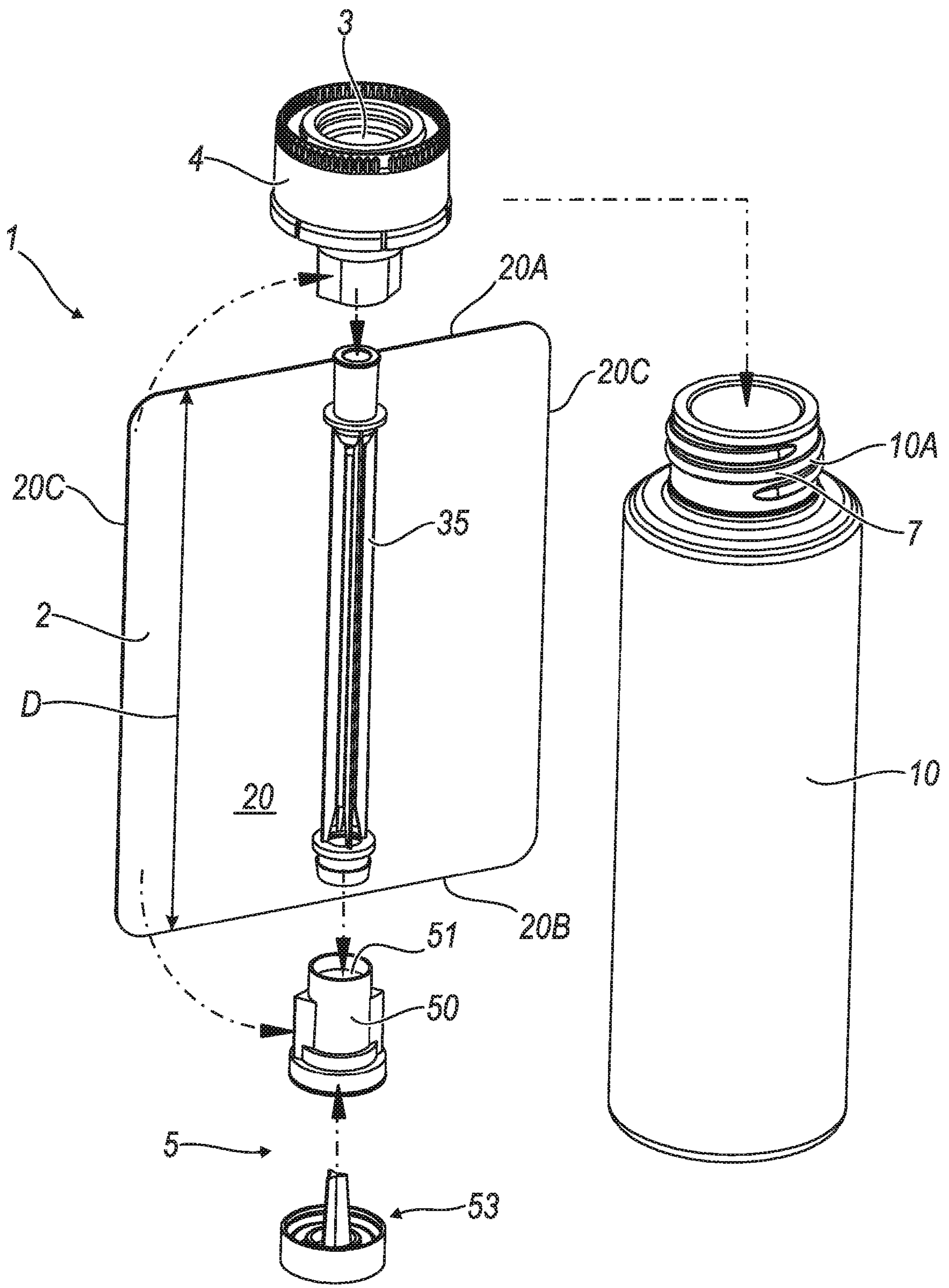
FIG. 2 is a perspective and exploded view of the device of FIG. 1.

In the example shown in FIGS. 1 thru 9, the bag 2 is realized by joining two sheets 20 made from a multilayer material at their upper edges 20A, lower edges 20B, and side edges 20C (FIG. 2). It is also possible to provide one unique sheet 20 made of multilayer material folded onto itself and the upper edges 20A, lower edges 20B, and side edges 20C of which are joined together.

The sheets 20 are joined at the edges 20A, 20B, 20C indeed, so as to create an internal cavity of the bag 2 for containing the fluid substance S.

Said edges 20A, 20B, 20C are joined together so as to hermetically close the cavity, preferably by welding.

Figure 3:
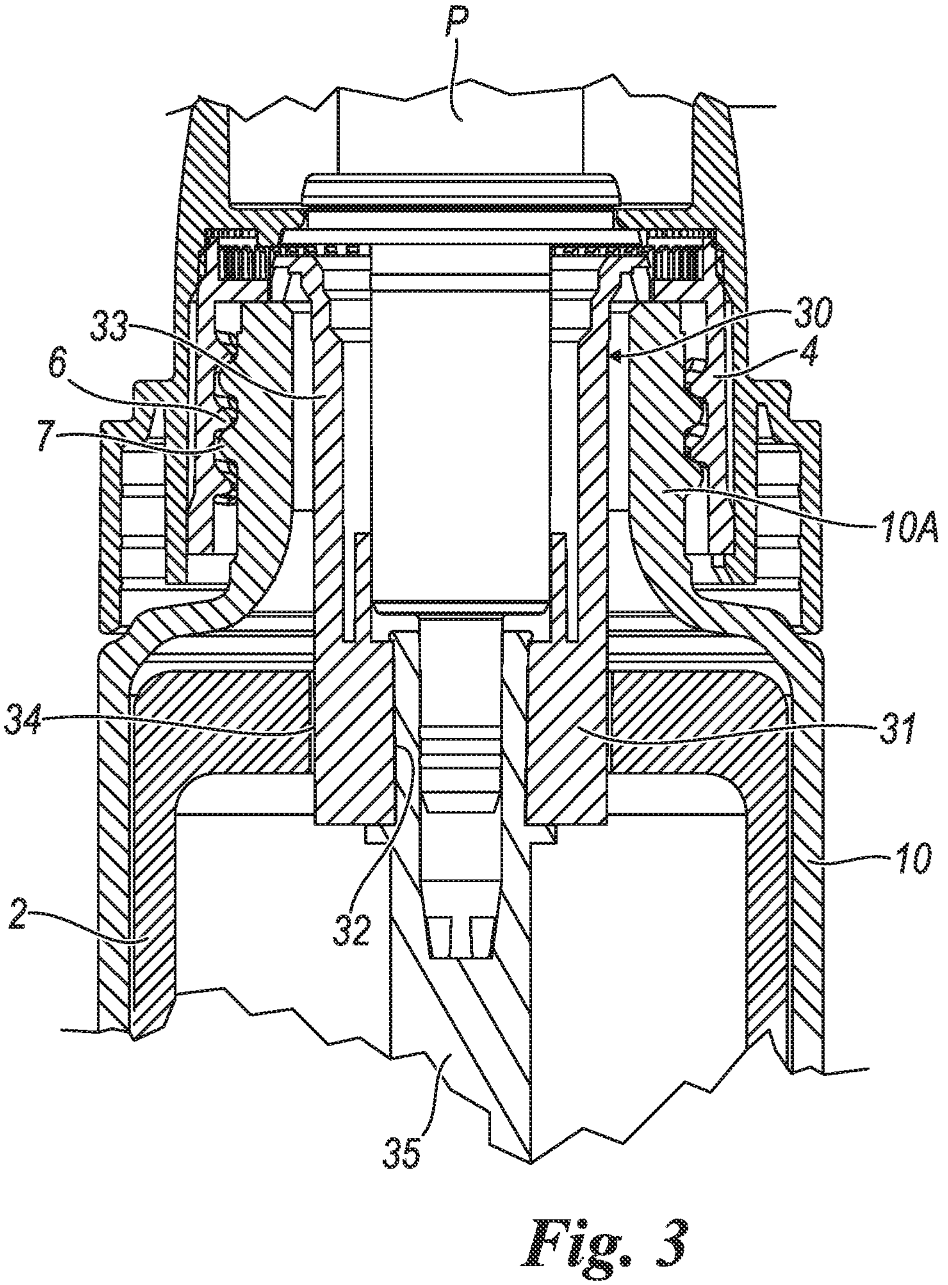
FIG. 3 is an enlarged view of a detail of the device of FIG. 1.

The neck 3 is made from a material different from that of the bag 2 and comprises a cup-shaped element 30 comprising a bottom wall 31 provided with at least one opening 32, and a side wall 33. The bottom wall 31 has such a thickness as to present an outer surface 34 which the upper edge 20A of the bag 2 is hermetically connected onto (FIG. 3).

Therefore, the neck 3 is firmly connected to the bag 2, so as to form one piece therewith.

The neck 3 is opportunely made from a rigid plastic material.

The cup-shaped element 30 forms a seat having such dimensions as to be able to at least partially accommodate the body of the pump P of the substance S dispensing system.

Preferably the cup-shaped element 30 comprises a dip element 35 which extends from its bottom wall 31 so as to be arranged inside the internal cavity of the bag 2 whenever the cup-shaped element 30 is connected to the bag 2 (FIGS. 1, 2, and 5 thru 9).

According to the present invention, the device 1 comprises a valve element 5 suitable for being moved at least from an opening position, wherein the valve element 5 allows to access the internal cavity of the bag 2, to a closing position, wherein the valve element 5 inhibits the access to the internal cavity of the bag 2.

In a first variant of the device 1, illustrated in FIGS. 1 thru 9, the valve element 5 is arranged at the lower edge 20B of the bag 2. More precisely, the valve element 5 is inserted between the two lower edges 20B of the sheets 20 (or between two portions of the lower edge 20B, should the bag 2 comprise one folded sheet 20 only) made from a multilayer material, and is caught in the weld of the lower edge 20B of the bag 2. In this way the internal cavity of the bag is always hermetically closed.

In this variant, it is particularly advantageous, but not mandatory, to make the dip element 35 assume a length substantially equal to the distance D that separates the upper edge 20A from the lower edge 20B of the bag 2 (FIGS. 1 and 2), and connected to the valve element 5 at its lower end. Such dip element 35 imparts a bigger sturdiness to the device 1, and is suitable for operating as a support for rolling-up the bag on itself, so as to make its insertion inside the external container 10 easier, as it will be better explained below. In addition, such dip element 35 holds the valve element 5 in position during the operating step whereby the bag 2 is filled with the fluid substance S.

Alternatively, it is possible that the valve element 5 be provided with locking members that connect to the external container 10, at its bottom wall. It is worth pointing out that the presence of a valve element in the lower edge 20B of the bag 2 makes it necessary to drill a through-hole in the bottom wall of the external container 10, in order to fill the bag 2 after it is inserted inside the external container 10.

The valve element 5 comprises a fixed part 50 connected to the lower edge 20B of the bag 2, delimiting a passage channel 51 for the passage of the fluid substance S and provided with a breakable internal member 52 which closes the passage channel 51, for instance a membrane. The valve element also comprises a movable part 53 connected to the fixed part 50 and suitable for being moved between a first operating position, wherein the movable part 53 does not interfere with the breakable internal member 52 (FIG. 4A), a second operating position, wherein the movable part 53 breaks the breakable internal member 52 and leaves the passage channel 51 open (FIG. 4B), and a third operating position, wherein the movable part 53 closes the passage channel 51 (FIG. 4C).

Preferably, the movable part 53 comprises first and second connection means 60A, 70A, and the fixed part 50 comprises first and second connection counter-means 60B, 70B suitable for cooperating with the first and second connection means 60A, 70A of the movable part.

Advantageously the movable part 53 comprises an annular element 54 and a central element 55 removably connected to the annular element 54 and in such a way as to have at least one opening between the annular element 54 and the central element 55 to enable the fluid substance S to pass through.

The central element 55 is connected to the annular element 54 via breakable connection members 56, preferably angularly distributed between the central element 55 and the annular element 54.

The annular element 54 comprises an inner wall 540 and an outer wall 541 separated from the inner wall 540 in such a way as to create a gap 542. Such gap is suitable for interacting with a circular edge 500 of the fixed part 50 of the valve element 5, by interference. Both the inner wall 540 and the outer wall 541 project substantially perpendicular from a third wall 543.

The two walls 540, 541 and the gap 542 of the annular element 54 make-up the first connection means 60A of the movable part 53, whereas the circular edge 500 makes-up the first connection counter-means 60B of the fixed part 50.

Likewise, the central element 55 comprises a disc-shaped member 550, from the outer edge of which an annular wall 551 extends in a direction perpendicular to the plane of the disc-shaped member 550. Such annular wall 551 is suitable for connecting to the fixed part 50 by interference inside the channel 51 to let the fluid substance S pass through.

Therefore, such annular wall 551 makes-up the second connection means 70A of the movable part 53, whereas the initial portion of the inner surface of the channel 51 makes-up the second connection counter-means 70B of the fixed part 50.

Let's point out that the circular edge 500 suitable for engaging the gap 542 of the annular element 540 of the movable part 54 is arranged outside the channel 51 for the passage of the substance S, so as to be axially spaced away from the channel 51 itself, with respect to the longitudinal axis of the latter.

The central element 55 of the movable part 53 also comprises an axial member 552 axially projecting from the disc-shaped member and suitable for interfering with and breaking the breakable internal member 52 which closes the channel 51 of the fixed part 50.

The operation of the invention is the following.

The first operation consist of prearranging the device 1, wherein the cup-shaped element 30 is firmly connected to the upper edge 20A of the bag 2 and the valve element 5 is firmly connected to the lower edge 20B of the bag 2.

It is preferred that, before being filled, the bag 2 be totally empty, even of air. It is also preferred that the valve element 5 be set to its first operating position, as described above.

The device 1 is then inserted inside the external container 10, and the valve element is inserted in the hole drilled in the bottom wall of the external container 10. In order to make this insertion easier, it is possible to roll-up the bag 2 around the dip element 35, so as to present a transversal dimension smaller than the diameter of the opening of the neck 10A of the external container 10. Obviously, it is also possible to insert the device 1 inside the external container 10 without rolling-up the bag 2 around the dip element 35.

Then a pumping member P is added to the external container, in a manner that is conventional for those skilled in this art. This step might also be performed after the bag 2 is filled with the substance S.

At this point the filling step of the bag 2 can start.

When the movable part 53 is set to its first operating position, it is connected to the fixed part 50 only via the annular element 54.

Filling is performed by means of an appropriate apparatus provided with a nozzle 200 suitable for interacting with the valve element by exerting a pressure onto the third wall 543 of the annular element 54 of the movable part 53 of the valve element 5.

A first pressure exerted by the nozzle determines a transition of the valve element 5 from its first operating position to its second operating position, wherein the breakable internal member 52 is broken by the axial member 552 of the central element 55 of the movable part 53.

In this second operating position, the circular edge 500 of the fixed part 50 is completely inserted in the gap 542 of the annular element 54 of the movable part 53. The opening between the annular element 54 and the central element 55 and the channel 51, devoid of the internal element 52, create a passageway for the fluid substance S towards the internal cavity of the bag 2. Being the valve element 5 engaged by the nozzle 200, it is inferred that in the instant in time the membrane 52 breaks, air cannot let inside the bag 2.

The fluid substance S is then injected into the internal cavity of the bag 2, which causes the bag 2 itself to inflate.

Having injected the desired quantity of substance S (a quantity that not necessarily corresponds to the maximum capacity of the bag 2) a further pressure exerted by the nozzle 200 causes the valve element 5 to move from its second operating position to its third operating position.

The central element 55 is disconnected from the annular element 54 and pushed up to hermetically engaging the channel 51 of the fixed part 50. In this way, the valve element is closed and the filling has been performed with no possibility for air of letting in the bag 2.

FIGS. 10 thru 16 illustrate a second embodiment of the device according to the invention. In these figures, the elements common to the first embodiment as described above retain the same numeral references, with a prime added thereto.

In the second embodiment, the valve element 5' is arranged the neck 3' of the bag 2'.

More specifically, the valve element 5' is arranged in such a way as to rest onto the bottom wall 31' of the cup-shaped body of the neck 3'.

The valve element 5' is suitable for being opened only when it is engaged by a rigid element, and it is arranged in such a way as to be engaged by the body of the pumping member P' when it is mounted onto the neck 3' of the bag 2', so as to allow the fluid substance S' to pass through.

In the example illustrated in FIGS. 10 thru 16, the dip element 35' is a separate element which is inserted inside the neck 3'. The dip element 35' comprises an abutting member 350', for instance an annular flange, suitable for abutting against the bottom wall 31' of the neck 3' and positioned in such a way as to leave an upper end portion 351' of the dip element 35' inside the neck 3'. Note that such upper end portion 351' has such an inner diameter as to be able to receive a lower end portion P1' of the pump P'.

The valve element 5' comprises a fixed part 50' which determines a channel 51' for the passage of the fluid substance S', and a movable part 53', resting in turn on the abutting member 350' of the dip element 35'.

The fixed part 50' comprises a substantially cylindrical body 500' provided with an annular abutting member 501' arranged internally to the fixed part 50' at its lower edge.

The movable part 53' comprises a base 530' from which an elastic member 531', in this case a spring, extends, at the free end of which an annular member 532' is provided, closed by a breakable internal member 52', preferably a membrane. The annular member 532' has an outer diameter smaller than the outer diameter of the fixed part 50', and slightly greater than the inner diameter of the abutting member 501' of the fixed part 50', so as to strike the abutting member 501', and thus to close the channel 51'. Note that the inner diameter of the annular member 532' preferably corresponds to the inner diameter of the upper end portion 352' of the dip element 35'.

In order to fill the bag 2' with the fluid substance S', use is made of a nozzle provided with a pusher member 201' suitable for passing inside the fixed part 50' so as to push the annular member 532' of the movable part 54' so as to open the channel 51' and enable the fluid substance S' to flow out (FIG. 15). The pusher member 201' shall have a diameter smaller than the inner diameter of the fixed part 50' of the valve element 5'.

When the filling of the bag 2' is over, upon removal of the nozzle, the annular member 532', which is pushed by the spring 531', immediately and automatically closes the channel 51'. Therefore, air has not been allowed to let in the bag 2', from the start up to the end of the filling.

Upon installing the pump P', its lower end portion 351' is made pass inside the fixed part 50' so as to exert a pressure onto the membrane 52' of the movable part 53'.

When the annular member 532' of the fixed part cannot be pushed any longer, for instance because it abuts against the upper edge of the dip element 35', the lower end portion P1' of the pump P' breaks the membrane 52', and it is stably inserted inside the upper end portion of the dip element 35'. In this way, the pump P' is able to pick-up the substance S' from inside the bag 2'.

Let's point out that, in the light of the above considerations, in this second variant the pumping member P' is added to the external container 10' after the filling step.

The present invention also concerns a system 100, 100' for containing and dispensing a fluid substance, the system 100, 100' comprising:

a device 1, 1' according to any of the attached claims,
a pumping member P, P' arranged in the neck 3, 3' of the bag 2, 2' of the device 1, 1', the neck 3, 3' of the bag 2, 2' comprising connection means 4, 4',
an external container 10, 10' wherein the bag 2, 2' is inserted, the external container 10, 10' comprising a neck 10A, 10'A delimiting an opening giving access to a internal cavity of the external container 10, 10', and comprising connection counter-means 7, 7' suitable for cooperating with the connection means 4, 4' of the neck 3, 3' of the bag 2, 2'.

In the system 100, 100' it is preferred to arrange the pumping member P, P' and the bag 2, 2' connected to each other in such a way as to make it possible for them to be taken out from the external container 10, 10' together when the fluid substance S, S' is exhausted. Such a connection can be performed by using different types of members, as already known.

The invention claimed is:

1. A device for containing a fluid substance, comprising:
a bag comprising at least one flexible side wall,
a substantially rigid neck extending from said bag and delimiting an opening giving access to an internal cavity of said bag, said neck being shaped to at least partially accommodate a pumping member for pumping said fluid substance, and provided with connection means for its connection to an external container,
wherein the bag is made from a multilayer material, and the neck is made from a material different from that of the bag and comprises a cup-shaped element comprising a bottom wall provided with at least one opening, and a side wall on the outer surface of which the upper edge of the bag is hermetically connected;

wherein said device comprises a valve element suitable for being moved at least from an opening position, wherein said valve element allows to access said internal cavity of the bag, and a closing position, wherein said valve element inhibits the access to said internal cavity of the bag, wherein the valve element is arranged at the lower edge of the bag, wherein the valve element comprises a fixed part connected to the lower edge of the bag, delimiting a passage channel for the passage of the fluid substance and provided with a breakable internal member which closes said passage channel, and a movable part connected to said fixed part and suitable for being moved between a first operating position, wherein said movable part does not interfere with said breakable internal member, a second operating position, wherein said movable part breaks said breakable internal member and leaves said passage channel open, and a third operating position, wherein said movable part closes said passage channel.

2. A device according to claim 1, wherein the side wall of the bag comprises at least one flat element provided with at least an upper edge and a lower edge, wherein at least the upper edge and the lower edge are hermetically closed, the neck of the bag departing from said upper edge.

3. A device according to claim 1, wherein the cup-shaped element comprises a dip element which extends from its bottom wall to be arranged inside the internal cavity of the bag when the cup-shaped element is connected to said bag.

4. A device according to claim 3, wherein the dip element has a length substantially equal to the distance that separates the upper edge from the lower edge of the bag, and is connected to the valve element at its lower end.

5. A device according to claim 1, wherein the movable part of the valve element comprises connection means, and the fixed part of the valve element comprises connection counter-means suitable for cooperating with said connection means of the movable part whenever said movable part is set to its third operating position.

6. A system for containing and dispensing a fluid substance, said system comprising:

a device according to claim 1, a pumping member arranged in the neck of the bag of said device, said neck of the bag comprising connection means, an external container wherein said bag is inserted, said external container comprising a neck delimiting an opening giving access to an internal cavity of the external container, and comprising connection counter-means for cooperating with said connection means of said neck of the bag.

7. A system according to claim 6, wherein the side wall of the bag of the device comprises at least one flat element provided with at least an upper edge and a lower edge, wherein at least the upper edge and the lower edge are hermetically closed, the neck of the bag departing from said upper edge.

8. A system according to claim 6, wherein the cup-shaped element of the device comprises a dip element which extends from its bottom wall to be arranged inside the internal cavity of the bag when the cup-shaped element is connected to said bag.

9. A system according to claim 8, wherein the dip element has a length substantially equal to the distance that separates the upper edge from the lower edge of the bag, and is connected to the valve element at its lower end.

10. A system according to claim 6, wherein the movable part of the valve element of the device comprises connection means, and the fixed part of the valve element of the device comprises connection counter-means suitable for cooperating with said connection means of the movable part whenever said movable part is set to its third operating position.

* * * * *